United States Patent
Stanford-Jason et al.

(10) Patent No.: US 9,594,720 B2
(45) Date of Patent: Mar. 14, 2017

(54) INTERFACE BETWEEN A BUS AND A INTER-THREAD INTERCONNECT

(71) Applicant: XMOS Limited, Bristol (GB)

(72) Inventors: Andrew Stanford-Jason, Salisbury (GB); Michael David May, Bristol (GB); Nigel Jürgen Toon, Bristol (GB); Daniel John Pelham Wilkinson, Bristol (GB)

(73) Assignee: Xmos Limited, Bristol (GB)

( * ) Notice: Subject to any disclaimer, the term of this patent is extended or adjusted under 35 U.S.C. 154(b) by 715 days.

(21) Appl. No.: 14/059,127

(22) Filed: Oct. 21, 2013

(65) Prior Publication Data
US 2015/0113184 A1    Apr. 23, 2015

(51) Int. Cl.
| | |
|---|---|
| *G06F 13/42* | (2006.01) |
| *G06F 13/24* | (2006.01) |
| *G06F 15/173* | (2006.01) |
| *G06F 9/30* | (2006.01) |
| *G06F 9/38* | (2006.01) |

(52) U.S. Cl.
CPC ........ *G06F 13/4286* (2013.01); *G06F 9/3009* (2013.01); *G06F 9/30072* (2013.01); *G06F 9/30087* (2013.01); *G06F 9/30123* (2013.01); *G06F 9/3851* (2013.01); *G06F 13/24* (2013.01); *G06F 15/17356* (2013.01)

(58) Field of Classification Search
CPC .. G06F 13/4286; G06F 13/24; G06F 9/30072; G06F 9/30087; G06F 9/3009; G06F 9/30123; G06F 9/3851; G06F 15/17356
See application file for complete search history.

(56) References Cited

FOREIGN PATENT DOCUMENTS

WO    2009/007170 A1    1/2009

OTHER PUBLICATIONS

Cimino Et Al.; "The Design of a Software—Defined PC Interface for Mechatronic Applications"; 5th Intl. Conference on Automation, Robotics and Applications, Dec. 6-8, 2011; pp. 424-429.
"AMBA 3 AHB-Lite Protocol vol. 1 Specification" Dec. 31, 2006, 72 pages total.
Holger Et Al.; "AMBA to SoCWire Network on Chip Bridge as a Backbone for a Dynamic Reconfigurable Processing Unit"; 2011 NASA/ESA Conference on Adaptive Hardware and Systems (AHS);, IEEE; Jun. 6, 2011; pp. 230-231.
Gantel Et Al.; "Dataflow Programming Model for Reconfigurable Computing"; 6th Intl. Workshop on Reconfigurable Communication—Centric System—On Chip; Jun. 20, 2011; pp. 1-8.
International Search Report and Written Opinion dated Jan. 28, 2015 from the International Searching Authority in counterpart Application No. PCT/EP2014/072460.

*Primary Examiner* — Glenn A Auve
(74) *Attorney, Agent, or Firm* — Sughrue Mion, PLLC

(57) ABSTRACT

A processing apparatus comprising: a bus; a first processor connected to the bus and configured to communicate over the bus according to a bus protocol; a second, multithread processor; and an inter-thread interconnect based on a system of channels. The apparatus also comprises an interface between the bus and the inter-thread interconnect, comprising a bus side implementing the bus protocol and an interconnect side for interfacing with the system of channels. The first processor is thereby operable to communicate with a designated one of said threads via the bus and a respective channel of the inter-thread interconnect.

26 Claims, 6 Drawing Sheets

INTERFACE BETWEEN A BUS AND A INTER-THREAD INTERCONNECT

TECHNICAL FIELD

The present disclosure relates to the medium by which a sequence of instructions running on a processor can communicate with other elements.

BACKGROUND

In many areas of modern computer science it has become the practice to exploit at least some form of parallelism through the use of techniques such as multi-thread and/or multi-core processing.

A thread refers to a respective sequence of instructions and a multi-thread processor enables multiple threads to be executed in parallel on a given processor core. For example this parallelism may be achieved by interleaving the instructions of the different threads through the same execution unit or pipeline of the core, or each thread may be run on a respective one of multiple execution units or pipelines of the same core (the execution units being part of the same core in that they share certain other resources or hardware such as memory on the same die). Each thread may also be supported by a respective set of registers, referred to as a context. The context used for a thread may comprise the thread's program counter, a status register, and operand registers for storing operands of the thread. The contexts facilitate the parallel execution of the threads, e.g. by retaining the current program state of each thread while switching between threads in an interleaved implementation.

It is also possible to create a processor comprising multiple cores on the same integrated circuit (IC) die, multiples die in the same chip package, or even an array of interconnected chip packages on the same board. Further, one or more of the multiple cores may be equipped with multi-threading capability so as to execute multiple threads on the respective core.

International patent application publication number WO 2009/007170 discloses a switch-based interconnect architecture by which a thread running on one multi-threaded processor core can communicate with another thread on the same core or a different core. Each core comprises a plurality of channel terminals, also referred to as "channel ends". Each channel end is a block comprising an input buffer, output buffer and associated registers. The channel ends can be dynamically claimed by threads, and dynamically connected together to form channels between threads over the interconnect. The channel ends can then subsequently be disconnected from one another and released by the threads, to be re-used to form other channels between other combinations of threads. The interconnect comprises a system of switches which route messages to the specific destination channel ends of the respective channels.

Processor cores based on this technology are currently on the market sold under the trade name xCORE, and a corresponding interconnect goes under the name xCONNECT. Each thread sees the threads on the other core or cores according to the same interconnect protocol as it does the threads on the same core. Hence from a higher-level software developer's point of view, each thread may be considered as a respective "logical core" regardless of which physical core it happens to be implemented on.

A core can also connect to other, external components via one or more separate ports. A component accessed via a port is not integrated into the same interconnect system as the inter-thread communications between the threads on the various cores.

SUMMARY

Other more conventional processors communicate with other components over a conventional bus, e.g. to access peripheral devices connected to the bus. It may be desirable to connect together a first processor of this kind with a second, multi-thread processor having one or more cores. For instance, it may be desired to arrange the first processor as a general purpose processor and the second processor as a dedicated input-output (I/O) processor to provide functionality of one or more devices to the first processor, either by running part of the device driver of a peripheral device on the second processor or by implementing functionality internally within the second processor that would otherwise be provided by a peripheral device. In embodiments the first processor may be a single core processor operating based on only sequential execution, while each of the one or more device drivers may be implemented on a respective one or more threads of the second processor.

However, a bus works by a different mechanism than an interconnect of the kind outlined above. For instance, to communicate with another component on the bus, the processor or transmitting component simply places a word of data onto the bus along with an address. There is no concept of a channel being established between one specific endpoint and another. Rather than being routed selectively to a specific destination, the data and address appear at the inputs of all other components on the bus, and it is up to each of those components to examine the address and thereby determine whether the data currently appearing on the bus data lines are intended for that component. There may also be other differences, such as differences in data format or other differences in communication protocol.

Hence to connect together a first processor with a second, multi-thread processor may require an interface not just between two components, but between two communication media—a bus and an interconnect. Such an interface could be implemented by a port of the multi-thread processor with the bus protocol being implemented in dedicated hardware logic at the bus side of the port. However, in that case a thread on the second, multi-threaded processor would not see the first processor as being integrated into the same interconnect system as the other threads on the one or more cores of the second processor. It would be desirable to provide a more synergistic way of interfacing between the first processor and the second processor, by interfacing with the inter-thread interconnect system itself.

According to one aspect disclosed herein, there may be provided a processing apparatus comprising a bus, a first processor connected to the bus, a second processor arranged to execute multiple threads, and an inter-thread interconnect comprising a system of channel terminals. The bus operates according to a bus protocol for performing read and write operations over the bus. Further, each channel terminal of the interconnect is operable to be used by one of the threads to perform input and output operations over a channel comprising a logical connection with another channel terminal. This includes being able to communicate with another of the threads by performing input and output operations over a channel with another of the channel terminals used by the other thread. The apparatus further comprises an interface between the bus and the inter-thread interconnect. The interface comprises a bus side implementing the bus protocol, and an interconnect side having an instance of at least one channel terminal. The first processor is thereby operable to communicate with a designated one of said threads (e.g. designated by a programmer of the second processor) via both the bus and a respective channel of the inter-thread interconnect, i.e. a respective channel between the channel terminal of the interface and a respective one of the channel terminals of the interconnect that is used by the designated thread.

In this arrangement the same terminal can be used by a given thread for both of two purposes: connecting to a channel end of another thread, and (e.g. at other times) connecting to the channel end of the bus interface. Thus the interface is able to integrate into the threads' interconnect system in a more deeply integrated fashion. Further, the interface associates a bus address of the bus with the channel terminal of the interface, and provides a protocol to synchronise data transfer between the read/write operations of the bus and input/output operations of the channel terminal. This means the relevant thread on the second processor is presented to the first processor as having an address on said bus, while reciprocally the first processor is presented to the designated thread on the second processor as being accessible via the inter-thread interconnect.

In embodiments, the bus side may implement the bus protocol in dedicated hardware circuitry. In such embodiments the channel terminal of the interface comprises a block in the interface imitating one of the channel terminals of the interconnect. In alternative embodiments, the bus side may implement the bus protocol in the software of a first of said threads. In that case, the channel terminal of the interface is one of the channel terminals of the interconnect, i.e. the channel terminal used by the first thread to communicate with the designated thread via the channel with the channel terminal of the designated thread.

According to another aspect disclosed herein, there may be provided a computer program product comprising code embodied on a computer-readable storage medium. The code comprises at least a first thread to be executed on a multi-thread processor, wherein the first thread is configured so as when executed on the multi-thread processor to provide an interface between a bus and an inter-thread interconnect of the multi-thread processor. In this implementation the bus protocol of the bus is implemented in the code of the first thread, the first thread thus being configured to perform one or more bus transactions to communicate with a first processor over said bus using the bus protocol. The first thread is also configured to communicate with a second thread of the multi-thread processor over a channel of said inter-thread interconnect. The communication with the second thread over said channel is based on the one or more transactions performed to communicate with the first processor using said bus protocol, or vice versa.

According to another aspect disclosed herein, there may be provided a method comprising using a first processor to run at least part of a respective device driver for each of one or more devices, the first processor being arranged to communicate with each device over a bus according to a bus protocol based on memory mapped addresses. The method further comprises using at least one respective thread of a second, multi-thread processor to operate to provide functionality of each device to the respective part of the device driver on the first processor. An interface is provided between the bus and an interconnect of the second processor, the interconnect being operable to communicate between the threads using a system of channels. The interface is provided by associating one or more memory mapped addresses of the bus with a channel of the interconnect, thus enabling communication between the first processor and the device by presenting the device to the first processor as being accessible via an address on said bus, and presenting the first processor to the respective thread as being accessible over a channel of said interconnect. In embodiments, the second processor comprises one or more ports for connecting to peripheral devices, wherein at least one of said one or more devices comprises a peripheral device, and said functionality comprises providing a front-end part of the device driver to drive the peripheral device via one of the ports. Alternatively, said functionality may comprise implementing the device in software on the second processor itself.

It will be appreciated that this Summary is provided only to outline certain concepts. The scope of the present disclosure is not limited by the Summary nor by any particular advantages or disadvantages noted herein, but only by the accompanying claims.

BRIEF DESCRIPTION OF THE DRAWINGS

For a better understanding of the present disclosure and to show how embodiments may be put into effect, reference is made by way of example to the accompanying drawings in which.

DETAILED DESCRIPTION OF EMBODIMENTS

The following describes some example embodiments combining a first processor that has features to optimise general purpose sequential execution with a second processor that has features to optimise I/O processing. The general purpose and I/O processors communicate by means of channels so that the I/O processor has dedicated resources such as memory that enable it to execute tasks in real-time.

On a general purpose processor there is normally a device driver that communicates with a peripheral device on behalf of the application program running on that processor. A device driver is a piece of software that provides a lower level protocol for interfacing between a higher level application or operating system and a device which the application or operating system is to make use of. For example, the program might issue a write function to send one or more bytes onto, say, an RS232 connection. The device driver will deal with the particulars of the UART that implements the RS232 and pass the bytes to the UART (Universal Asynchronous Transmitter/Receiver).

In embodiments disclosed herein, the functionality of a device driver may be split in two, with the part that connects with the application layer or operating system being remaining on the first, general purpose processor while a front-end part of the device driver is implemented on the second, I/O processor. In embodiments this can enable a single device driver on the first processor, with a single physical link, to serve a variety of application programs using a variety of devices implemented on the I/O processor. As far as the application programmer of the general purpose processor is concerned, he or she is able to use the same interface as before: the device driver. As far as the embedded programmer of the I/O processor is concerned, he or she is able to use the same real-time programming strategy as they would otherwise.

In embodiments the communication does not require shared memory shared between the two processors, and both the general purpose processor and the I/O processor have their own separate resources (pipeline, memory) and can therefore execute independently. This means that the I/O processor can execute real-time code as normal without interference. It also provides the natural programming models on both the general purpose processor and the I/O processor.

Figure 1:
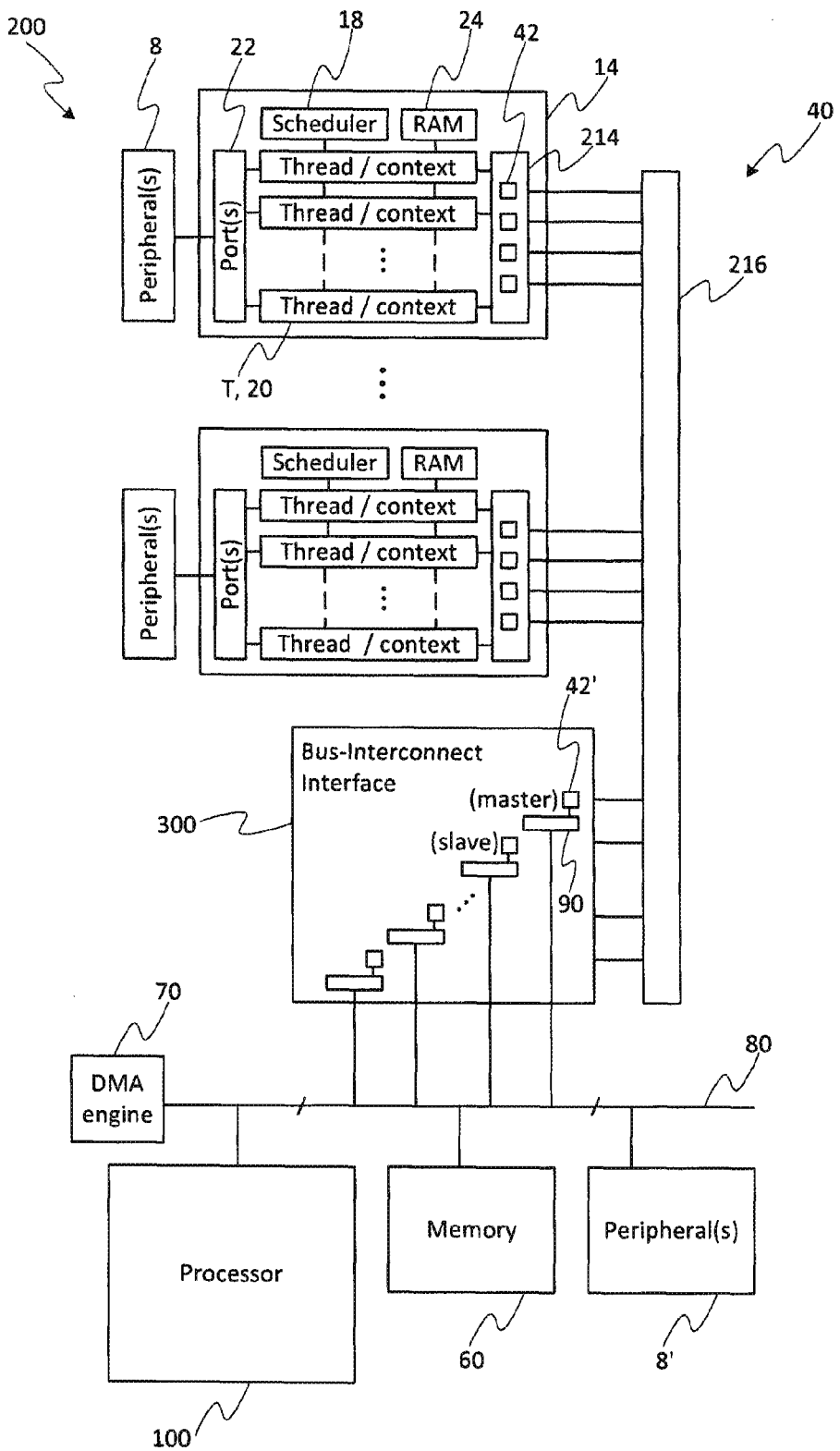
FIG. 1 is a schematic block diagram of a processing apparatus.

FIG. 1 shows an example of processing apparatus comprising a first, general purpose processor 100 and a second, multi-threaded I/O processor 200 according to embodiments disclosed herein.

As well as the first and second processors 100, 200, the apparatus comprises a bus 80 to which the first processor 100 is connected. The apparatus may also comprise one or more other components connected to the bus 80, such as a general purpose memory 60 or any one or more peripherals 8' that are not handled by the second, I/O processor 200. The first processor 100 is configured to communicate with other components by performing transactions to transmit and/or receive over the bus 80 based on a system of bus addresses according to the appropriate bus protocol for the bus 80, as follows.

Each component on the bus 80 has a "memory mapped" register or set of registers at its connection with the bus 80, being memory mapped in the sense that they have an address from which data can be read and to which data can be written, and are therefore addressable in a similar manner to memory addresses (the memory mapped component does not have to be a memory such as a RAM or storage device). To transmit over the bus 80, the first processor 100 places a word of data onto the data lines of the bus 80 and places the address of the destination component onto the address lines of the bus 80. The data and address are signalled over the whole bus 80, and each component is listening on the bus 80 for any signals that are addressed to it. If a destination component hears its address, it accepts the data from the bus into its corresponding memory-mapped register(s). Conversely to receive data over the bus 80, the first processor 100 listens of the bus for any signal addressed to it.

Optionally the bus system 80 may comprise a DMA engine 70, allowing the first processor 100 to set up one or a sequence of bus transactions which will then continue without continuing to occupy the processor 100 with the transmission and/or reception throughout. However, this is not essential.

In embodiments the first processor 100 may comprise a single core processor and/or a processor operating based on only sequential execution (as opposed to multi-threaded parallel execution). For example the first processor 100 may comprise a processor based on an ARM architecture. However, generally the first processor 100 may be any processor which communicates over a bus using a bus protocol.

The second processor 200 comprises one or more processor cores 14, each having its own I/O resources 22, 42 and memory 24 (comprising RAM and/or non-volatile storage).

Where there are multiple cores, these may be implemented on the same semiconductor die, on different die in the same chip package, and/or in different chip packages on the same circuit board. Each of the one or more cores 14 is equipped to execute multiple threads in parallel on that core, whether by interleaving or by executing on parallel hardware. In embodiments the code and/or data for the threads on a given core 14 may be stored on a shared memory 24 of that core 14. Each core 14 also comprises a thread scheduler 18 for dynamically selecting which of that core's threads to run, and plurality of hardware contexts 20, each context comprising a set of registers for supporting the execution a respective one of the threads. Further, the apparatus comprises an interconnect system 40 and each core 14 comprises a plurality of channel terminals or "ends" 42. The channel ends 42 can be dynamically claimed by threads and dynamically connected together to establish channels over the interconnect 40 between threads on the same core or different cores 14, as will be discussed in more detail shortly.

Each of the one or more cores of the second processor 200 also comprises one or more ports 22 for connecting to one or more peripheral devices 8. For example such peripherals 8 may comprise a UART device, a media device, a user input device, a servo, or an industrial monitoring device. In such an arrangement, each of the one or more peripherals 8 may be driven by a respective front-end part of a device driver implemented on a respective one or more of the threads running on the relevant core 14 of the second processor 200, while the application-facing part of the device driver remains implemented on the first processor 100. The device driver is configured to implement the specific protocols used to transfer data via the ports 22, e.g. re-formatting data such as converting it between parallel and serial formats, and possibly higher level functions such as encoding, compressing or encrypting the data. Where the second processor 200 is connected between the peripherals 8 and the first processor 100 and arranged to provide a device driver for the benefit of first processor 100, the second processor 200 thus acts as an I/O processor while the first processor 100 may be described as a host processor or general purpose processor.

Alternatively or additionally, one or more devices may be implemented in software on the second processor itself, rather than via a port 22, e.g. if the functionality can be implemented purely in arithmetic operations or algorithm steps without requiring special external hardware. In this case the device driver on the first processor 100 sees the device as it would normally see a corresponding peripheral providing the same functionality in a dedicated hardware device, but with the relevant functionality of that device actually being implemented in one or more threads specifically allocated for that purpose on the second processor 200. An example would be a device implementing one or more layers of an Ethernet stack, or a cryptography device that would otherwise normally be implemented in a dedicated hardware block.

Figure 1A:
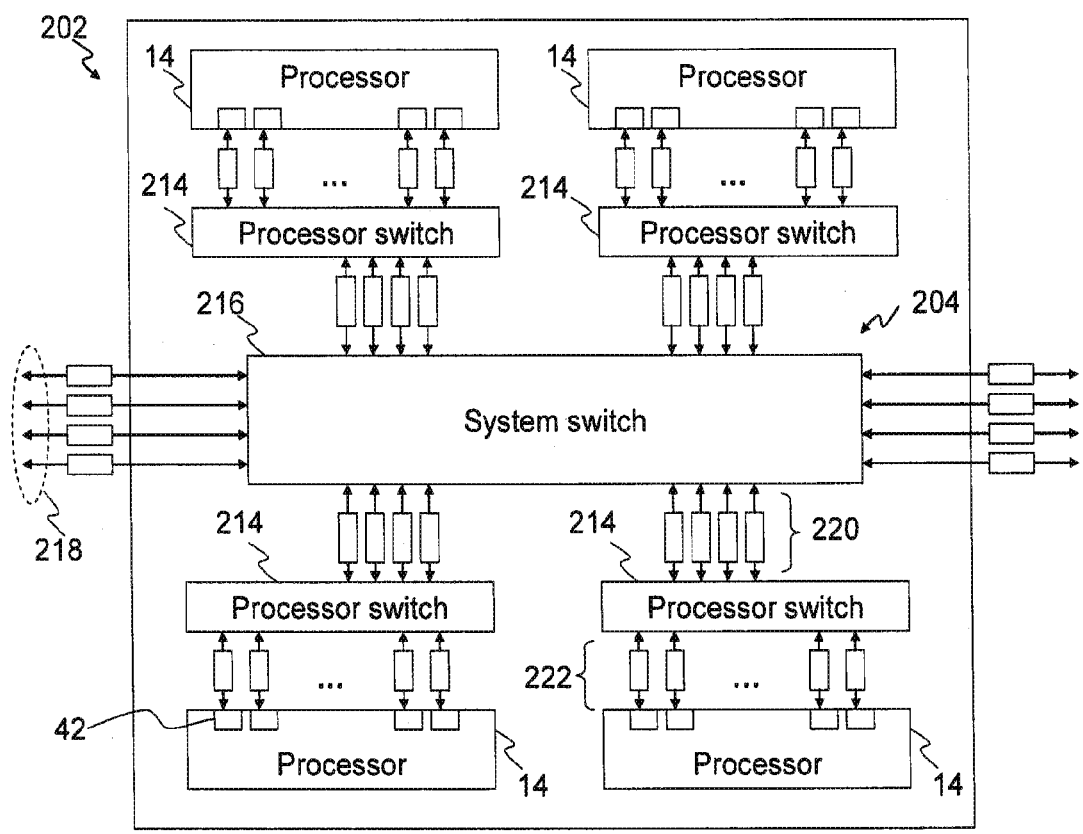
FIGS. 1a-1b give schematic block diagrams of a multi-core processor.
Figure 1B:
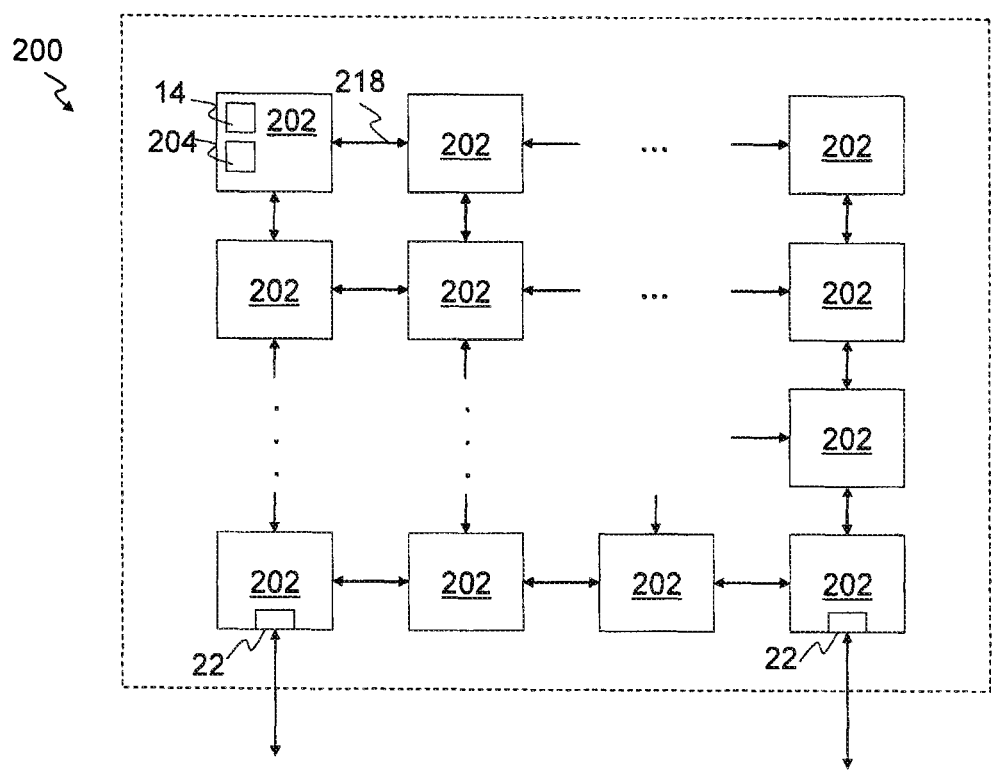

Note that there may be any number of cores 14 connected together in a variety of topologies. FIGS. 1a-1b show an example how a multi-core processor 200 may be built from an array of tiles 202, each tile comprising one or more cores 14.

Figure 2:
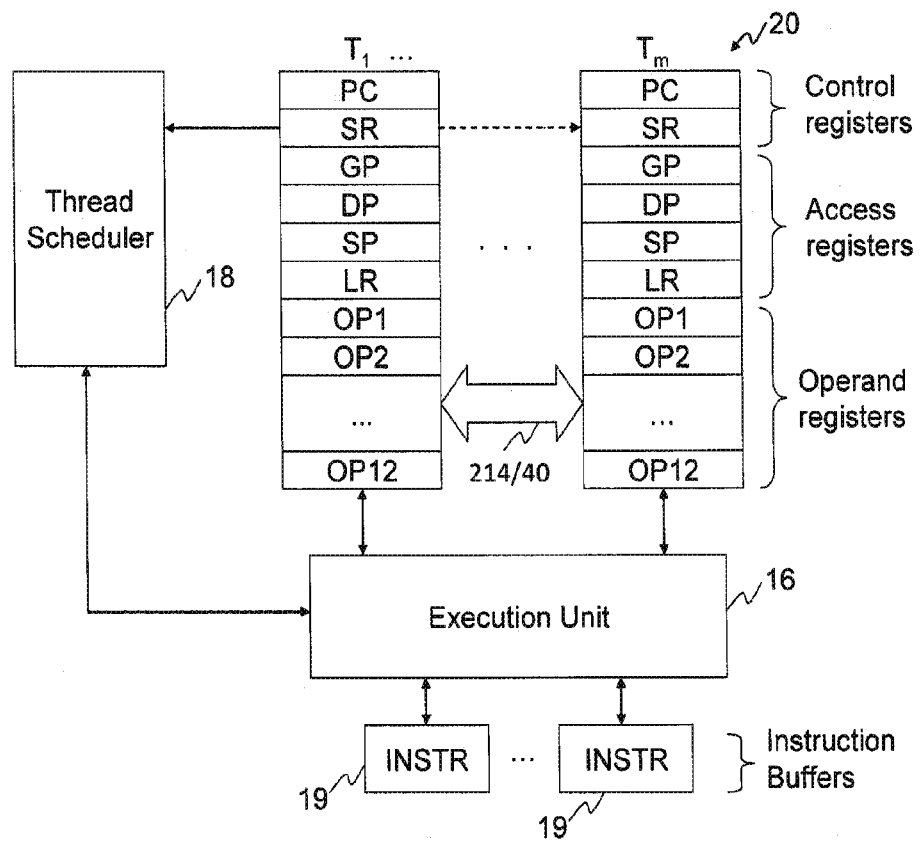
FIG. 2 is a schematic block diagram of a multi-thread processor.

FIG. 2 shows more detail of an example register architecture for implementing the thread contexts 20. Each of the threads $T_1 \ldots T_m$ currently under consideration by the thread scheduler 18 is represented by a respective set of thread registers $20_1 \ldots 20_m$, i.e. a respective context, to which the thread scheduler 18 and execution unit 16 are connected to have access. The execution unit 16 may be a pipelined execution unit. One or more instruction buffers (INSTR) 19 are also provided for temporarily holding instructions fetched from memory 24 before being subsequently issued into the execution unit 16 (instruction herein refers to a machine code instruction). Data can be communicated between register sets (contexts) 20 via channels established between channel ends 42 of an interconnect system 40, to be discussed shortly.

In the illustrated example, the state of each thread $T_1 \ldots T_m$ is represented by eighteen registers: two control registers, four access registers, and twelve operand registers. Of the two control registers, PC is the program counter of the respective thread, and SR is a status register for marking the status of the respective thread. The control registers thus store information on the status of the thread for use in controlling execution of the thread. Particularly, the ability of a thread to react to events or interrupts is controlled by information held in the thread status register SR. Of the access registers, SP is a stack pointer used for local variables of procedures, DP is a data pointer used for data shared between procedures, GP is a global pool pointer used to access large constants and procedure entry points, and LR is a link register. The operand registers OP1 ... OP12 are used for holding operands operated upon or resulting from the operations defined by the instruction opcodes of the respective thread's instructions when executed. The operand registers OP1 ... OP12 may be used by instructions which perform arithmetic and logical operations, access data structures, and call subroutines.

The execution unit 16 is connected so as to have access to each of these registers, and the thread scheduler 18 is connected so as to have access to at least the status register SR. The channel ends 42 and interconnect system 40 are arranged to allow the channels to be established between one or more operand registers OP of different threads, and optionally others of the registers 20.

Of the m threads, the thread scheduler 18 maintains a set of n runnable threads—the run set—from which it takes instructions in turn to be executed in an interleaved manner, e.g. based on a round robin scheme. A thread is scheduled for execution if it is included in the run set and so given a stake in the schedule. When it is a given one of the scheduled (runnable) threads' turn to have an instruction executed, the thread scheduler 18 causes one or more instructions of that thread to be fetched from a memory address defined by that thread's current program counter PC into one of the instruction buffers 19, and then to be executed by the execution unit 16. The scheduler 18 then proceeds to allow one or more instructions of the next thread in the schedule to be fetched for execution based on that thread's respective program counter PC, and so forth.

When a thread is unable to continue it is suspended by removing it from the run set. The reason for this may be, for example, because the thread is awaiting one or more of the following types of activity: (a) its registers 20 are being initialised prior to it being able to run, (b) it has attempted an input from a port 22 or channel end 42 which is not ready or has no data available, (c) it has attempted an output to port 22 or channel end 42 which is not ready or has no room for the data, or (d) it has executed an instruction causing it to wait for one or more events which may be generated when ports 22 or channel ends 42 become ready for input or output.

For example, if a thread executes an input instruction (IN) to input data from a port 22 or channel end 42, but the port 22 or channel end 42 does not currently have any data to input, then the thread scheduler 18 will pause that thread by removing it from the run set. Similarly if a thread executes an output instruction (OUT) to output data to a port 22 or channel end 42, but the port 22 or channel end 42 is not ready to accept data (e.g. it is still handling a previous output), then the thread scheduler 18 will again pause the thread by removing it from the run set. When paused, the state of the thread is left pending in the registers of the respective context 20 of that thread, so that when the port 22 or channel end 42 does become ready then the thread is ready to be quickly resumed. To resume the thread, it is returned to the run set and execution continues where it left off from the last program counter value in the thread's program counter PC, the execution continuing based on the program state as held in the respective context 20 without having to re-load the program state of the thread from memory.

Alternatively or additionally, in embodiments a thread is able to set up a pending event at a port 22 or channel end 42. The ports 22 and/or channel ends 42 may comprise one or more registers for storing an indication of the event associated with the port 22 or channel end 42. This indication may comprise an identifier of the thread associated with the event, and/or a continuation point vector defining a particular point in the code of the thread to return to when the event occurs. The event itself may be that data has been input from a port or channel, some specific data has been input, the port or channel is ready for output, a clock associated with the port or channel has reached a certain time, or a timer associated with the port or channel end has expired. Optionally the indication stored in the port or channel ends' event registers may define a specific event such as that some specific data being received, or alternatively the event type could be implicit, e.g. the event being generated when any data is input. The thread sets up the event in the relevant registers of the desired port 22 or channel end 42, then at some subsequent point executes a wait instruction (WAIT) which suspends the thread pending occurrence of the event. When the event occurs, the port 22 or channel end 42 returns the thread identifier to the thread scheduler 18 to resume the thread. If the continuation point vector is used, the thread resumes from the point in the code defined by the continuation point vector. In other respects, the continued execution may be based on the program state as left pending in the registers of the respective context 20 rather than necessarily having to be loaded from memory.

In embodiments each of the second processor cores 14 may be an xCORE which is equipped with the ability along the lines described above, i.e. the ability to associate each of one or more specified threads with activity expected from a respective specified port or channel, to suspend the thread pending that activity, and when the activity occurs to resume the thread based on program state held in registers associated with that thread. Thus a particular thread can effectively be "primed" to respond to activity from a particular source. These abilities are just some of the exemplary properties which enable the xCORE to react quickly to stimulus from other threads and/or external sources, making it particularly suitable to act as a real-time and/or I/O processor. Nonetheless, more generally the teachings of the present disclosure could also be applied to other types of multi-threaded processor.

Details of an example architecture for implementing an inter-thread interconnect 40 will now be described. As mentioned, each of the one or more cores 14 of the second processor 200 comprises one or more channel ends 42. Further, the apparatus comprises an interconnect 40 comprising one or more hardware switches 214, 216 for routing messages between the channel ends 42. Each channel end 42 is a block of dedicated hardware coupled to the inter-connect 40, and comprising registers and associated logic allowing the channel end 42 to be dynamically claimed for use by one of the threads on the same core 14, and to dynamically connected to the channel end 42 claimed by another thread on the same core 14 or another core 14, thereby establishing a channel with the other thread.

Once a channel is thus established, then when a thread outputs data to its channel end 42 the switches 214, 26 in the interconnect 40 will automatically route the data to the destination channel end 42 (and only that channel end 42) and therefore to the thread currently using that channel end 42. The interconnect 40 may comprise a processor switch 214 (e.g. an Xmos PSWITCH) associated with or integrated into a particular respective one or the one or more cores 14, and one or more system switches 216 (e.g. one or more Xmos SSWITCHes). The processor switches 214 are arranged to route between the channel ends of a given core 14, and the one or more system switches 216 are arranged to route between multiple cores 14 and/or between a core 14 and the bus-interconnect interface 300 (see below).

Figure 3:
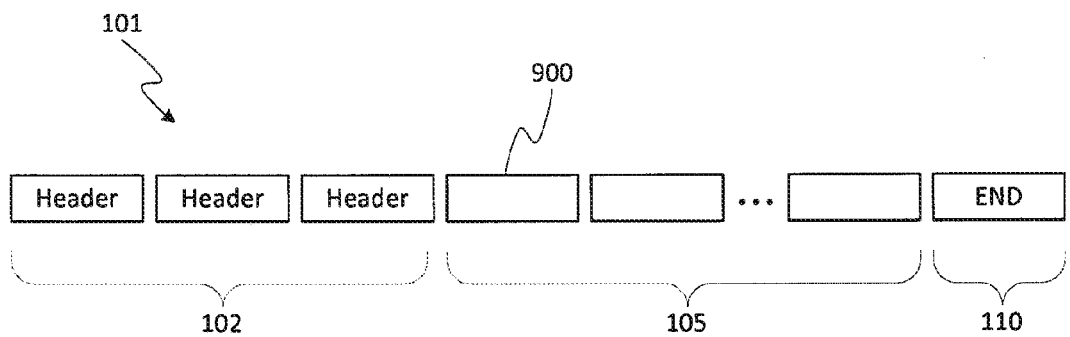
FIG. 3 is a schematic representation of a message format.

FIG. 3 shows an example message format 101 which may be used to transmit messages over the interconnect 40 between the channel terminals 42. Each message 101 is transmitted as a plurality of constituent tokens 900. In embodiments each token 900 may comprise a single byte of content. In one exemplary token format, each token 900 may also comprise a bit to identify the content as being either data or control information, and/or (for a transition based signalling protocol) an additional bit to ensure the total number of transitions on each wire of the interconnect 40 is even so that the link returns to a quiescent state after each token 900. With a single bit to specify data or control and a single bit to return the link to a quiescent state, this makes ten bits per token 900 in total. Each token 900 may be generated and transmitted by executing an individual respective machine code instruction. This allows messages to be build up and sent "on the fly", transmitting one token before others of the same message have necessarily even been generated (rather than requiring the whole message to be constructed in memory in advance before it can begin being transmitted).

The message 101 begins with a header 102 comprising one or more header tokens. This header identifies the destination channel end 42, and the switches 214, 216 are configured to use the header 102 to route the message 101 to its intended destination. In embodiments the header 102 may also form part of the mechanism by which the channel is established, in that when a thread outputs one or more data tokens to an as-yet unconnected channel end 42, the interconnect 40 will automatically interpret these as header tokens 102 and automatically connect that channel end 42 to the destination channel end 42 defined in the header 102. The message 101 then comprises one or more bytes of payload 105, followed by an end-of-message token (END) 110 which closes the channel.

The payload 105 may comprise a READ control token and one or more data tokens specifying a memory address of the destination core 14 from which to read data. As another example, the payload 105 may comprise a WRITE control token, one or more data tokens specifying a memory address on the destination core 14 to write to, and the data to be written. In embodiments, the payload 105 may comprise a return header identifying the source channel end 42 which the thread on the destination side of the channel should respond to. If responding to a message from another thread, the payload 105 may comprise an acknowledgment (ACK) control token plus any data requested, or negative acknowledgment (NACK) control token, sent back to the channel end 42 identified in the return header.

The claiming and connection of the channel ends 42 is dynamic in that the channel ends are not preconfigured or fixed as being associated with any one thread or any one other channel end 42. Rather, the thread can execute instructions "on the fly" or "in the field" during operation of the second processor 200 to claim one of the channel ends 42 (assuming it is free, i.e. not currently claimed by another thread), and to connect the thread to another channel end 42. When finished with the channel, one of the threads can dynamically execute instructions to subsequently disconnect the channel ends 42 from one another, and to free the channel ends 42 for use by other thread to create channels between other combinations of threads.

In embodiments, the one or more instructions which connect the channel ends 42 comprise one or more instructions to output one or more header tokens to an as-yet unconnected channel end 42 claimed by the outputting thread, and the one or more instructions which disconnect the channel may comprise an instruction which outputs an END token over the channel. As the one or more header tokens are routed through the switches 214, 216 of the interconnect 40, they create connections in the switches which establish the channel for routing subsequent tokens of the payload 105. As the END token passes along the respective channel through the interconnect 40, it closes the respective connections as it goes in order to close the channel.

Figure 4:
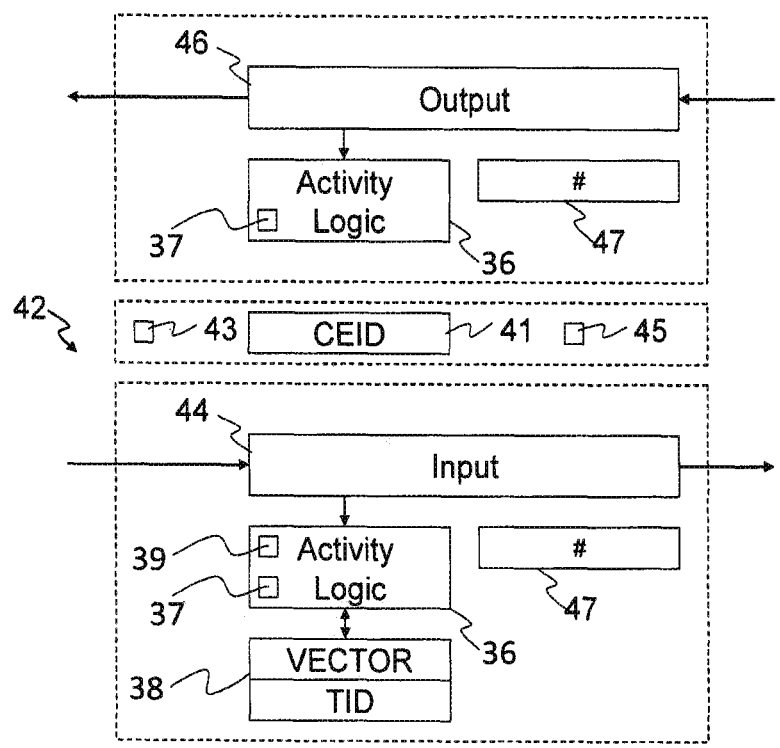
FIG. 4 is a schematic representation of a channel terminal.

An example of the architecture and method of operating the channel ends 42 is discussed in more detail in relation to FIG. 4.

Each channel end 42 comprises a buffer to hold incoming data before it is input or output, and in embodiments also a record of the amount of data held. The channel end 42 also keeps a record of whether it is connected to another channel end or not, and of the identifier of the connected channel end so that data output via the channel can be written to the correct input buffer. These buffers and records can be implemented for example in part of a "register file", which in this sense refers to a small block of dedicated storage on the processor 14 for implementing the registers and buffers (in embodiments the same may be said of other registers, e.g. the event registers of ports 22). The register file is distinct from general purpose RAM or storage such as memory 24, because each entry in the register file (i.e. each register) is reserved for a specific purpose and has a faster, more direct connection with the associated logic, not requiring a longer latency memory access operation.

As shown in FIG. 4, each of the channel ends 42 may comprise an input buffer 44 and an output buffer 46 to provide full-duplex data transfer between threads (although a single buffer would also be an option). The input buffer 44 is operable to input data from another channel end 42 to the register set (context) 20 of a thread, and the output buffer 46 is operable to output data from the register set (context) 20 of the thread to the other channel end 42. Preferably each buffer is able to hold sufficient tokens to allow at least one word to be buffered.

Each channel input buffer 44 and output buffer 46 may be associated with activity handling logic 36 for monitoring activity occurring over a channel and signalling the occurrence of certain activity by means of at least one ready flag 37 (a one-bit register). Potential activity may be: that data has been input to the channel, or that the channel has become available for output. If an output instruction is executed when the channel is too full to take the data then the thread scheduler 18 pauses that instruction and restarts or re-executes it again when there is enough room in the channel for the instruction to successfully complete. Likewise, when an input instruction is executed and there is not enough data available then the thread scheduler 18 pauses the thread until enough data does become available. Counters 47 in the channel end 42 may be provided to keep a record of the amount of data in the input buffer 44 and output buffer 46.

In order to establish a channel between two sets of thread registers 20 (between two contexts), two channel ends 42 will first be allocated and connected. As mentioned above, each channel end 42 can be allocated to any thread and each channel end 42 is connectable to any other channel end 42. To facilitate the allocation and connection of channel ends 42, each channel end 42 also comprises a channel end identifier register CEID 41 which records which other channel end 42 it is connected to, a connected flag 43 which records whether the channel end is connected, and a claimed flag 45 which records whether the channel end has been claimed by a thread.

In order to allocate respective channel ends 42 to each of the two threads, two respective "get channel end" instructions are executed, each of which instructions reserves a channel end 42 for use by one of the threads. These instructions each assert the claimed flag 43 of the respective channel end 42. A respective "get channel end" instruction may be executed in each of the two threads, or both "get channel end" instructions may be executed by one managing thread.

The channel ends 42 are then connected together by exchanging channel end identifiers as follows. When an output instruction of a first thread is executed in order to perform an output to the channel end 42 of a second thread, the connected flag 43 in the second thread's channel end 42 is used to determine whether the second thread's channel end is currently connected. If the second thread's channel end is not connected, the data supplied to that channel end is interpreted as an identifier of the first thread's channel end. This identifier is recorded in the CEID register 41 of the second thread's channel end and the connected flag 43 of the second thread's channel end is asserted. Reciprocally, an output instruction of the second thread is then executed to perform an output to the first channel end. Assuming the connected flag 43 of the first thread's channel end is not yet asserted, the data supplied to the first thread's channel end is interpreted as the identifier of the second thread's channel end. This identifier is recorded in the CEID register 41 of the first thread's channel end and the connected flag 43 of the first thread's channel end is asserted.

Once the channel ends 42 are connected, any output to the second channel end will determine the associated first channel end from the record in the second channel end's identifier register CEID 41. If there is enough room in the input buffer 44 of the second channel end to hold the data, the data will be transferred; otherwise the first thread's output instruction is paused. The supply of data to the second channel end by the output instruction may also un-pause the second thread if it was paused pending input to the second channel end, allowing it to take data. Similarly, if the effect of the second thread inputting data from the second channel end is to make space for data from a paused output of the first thread from the first channel end, this will un-pause the first thread's output allowing it to complete execution. The input may also trigger events (see below). For each thread, the thread scheduler 18 keeps a record of any paused output instruction, its associated data, and the channel end to which it is attempting to transfer data.

Once the channel is no longer needed, channel ends 42 can be disconnected by executing an instruction which outputs an "end of message" (END) control token. The channel ends 42 will then be available for connection with any other channel ends 42. Also, each channel end 42 can be freed from a thread by executing a "free channel" instruction. The channel ends 42 will then be freed for use by any other threads.

Described in terms of the channel register files, when a processor executes an output on a channel end c, the $c^{th}$ entry in the channel output file is checked to determine whether c is connected. If not, the output data d is interpreted as the identifier of the channel end to which further output on c will be sent. The address d is examined to determine whether it is an address of a channel end on the same processor. If so, the address d is written to the $c^{th}$ entry in the channel output file. Subsequent outputs via c will access the $c^{th}$ entry to determine the channel end connected to c and, provided it is not full, write the output data to the input data of the connected channel end d. If the buffer is found to be full, the output instruction is paused until there is enough space in the buffer, and in this case the outputting thread will be released by an input instruction which creates enough space.

When an input is executed on a channel end c, the $c^{th}$ entry in the input buffer file is read to determine whether it contains data. If so, the data is taken and the input completes. Otherwise the inputting thread is paused and will be released by a subsequent output instruction which writes sufficient data to the input buffer of c.

The thread scheduler 18 maintains a "paused table" with one entry for each thread, which is used to record which channel end is paused for (if any). Whenever an input on channel end c completes, or an output on a channel associated with a channel end c completes, this table is checked and if there is a thread paused for c it is released.

When an END token is output via c, the $c^{th}$ entry in the output file is modified to record that the channel end is no longer connected.

In transmission, the header of a message passes through one or more local processor switches 214 and may pass through one or more system switches 216. The interconnect 40 comprises a plurality of links 222 between the channel ends 42 of each core 14 and its respective processor switch 214, a plurality of links 220 between each processor switch 214 and one of the one or more system switches 216, and a plurality of links 218 (e.g. Xmos XLINKs) between one system switch 216 and another if there are more than one. For example refer again to FIGS. 1a and 1b. The header may comprise a portion specifying a destination channel end 42, a portion specifying a destination core 14, and in some cases a portion specifying a destination group 202 of cores 14 if there are a relatively large number arranged into groups (e.g. a group per processor tile or chip). For example each of these portions could be a separate header token.

When a header arrives at a processor switch 214 (e.g. after just being output by a channel end 42), the processor switch 214 reads the header portion identifying the destination core identifier. If it matches an identifier of the local core 14, the processor switch 214 reads the header portion identifying the destination channel end 42 and routes the packet to one of the local channel ends 42 on the same core 14. If on the other hand the header portion identifying the destination core does not match that of the local core 14, the processor switch 214 routes the packet to the system switch 216 to be directed to the processor switch 214 of the destination core 14. When a header arrives at a system switch 216, it reads the header portion identifying the destination group. If there is more than one system switch 216 (e.g. connecting between multiple groups or tiles 202) and the identifier of the destination group of cores 14 does not match that of the current system switch 216, then it routes to another system switch 216. If that header portion does match on the other hand, the system switch 216 examines the header portion that identifies the destination core 14 and routes to processor switch 214 of that core 14.

Each link 222, 220, 218 of the interconnect 40 contains control registers (not shown). As the header token passes through each switch 214, 216 then the switch's switching logic is triggered by the header token to create a route from the source link to a dynamically allocated target link by writing a target link identifier to a control register of the source link and a source link address to a control register for the target link. Once a route exists, all further tokens are sent along that route. The route will be disconnected when an END token is sent along the route. The END token disconnects each stage of the route as it passes through each switch 214, 216.

To elaborate, when data d is output to an unconnected channel end 42 on a different processor core 14, one of the links is dynamically allocated for the channel, and used to forward the identifier d to an interconnect switch (remembering that this data d is the header, i.e. the identifier of the destination channel). The identifier of the link used is written to the channel output file in association with the $c^{th}$ entry. Subsequent outputs via channel end c will access the $c^{th}$ entry to determine the link to be used to forward the output data. If the buffer in the link is full, the outputting thread will be paused; it will be released again when the link has forwarded the data and has room to buffer another output. This is done using the paused table.

When data starts to arrive at an unconnected link it is interpreted as the identifier of a destination channel end d, and this address is recorded in a register associated with the link. Subsequent data from the link will be written to the input buffer of the channel end d. If the buffer of the channel end d (i.e. the $d^{th}$ entry in the channel input file) is full, then the link flow control will prevent further data being sent by the switch until a thread has input sufficient data to make room in the input buffer.

When an input is executed on a channel end d, the input buffer is read to determine whether it contains data; if so the data is taken and the input completes. Otherwise the inputting thread is paused and will be released by the link supplying sufficient new data to the input buffer of d.

When a final END token is output via c, the END is forwarded to the switch and the $c^{th}$ entry in the output file is modified to record that the channel end is no longer connected. When the link receives the END, it is forwarded to d and the link is disconnected.

Note that in embodiments, the same mechanism of channel ends 42 may be used both for communications between threads on the same core 14 and for threads on different cores 14 or event groups of cores 14 (e.g. different tiles or chips). This also means that the channel end identifiers (IDs) are system wide. That is to say, each channel end ID is unique within the whole system of interconnected processor cores, such as within an array 200.

Channel ends 42 and links may be shared by several threads. It may be useful to allow a single channel end to be used to receive messages from any number of threads. To do this, each input channel end has the claimed flag 43 to indicate whether or not it is currently in use. If it is found to be in use at the start of a message when the header is output, the outputting thread is paused; it will be released when an END token next causes the channel end 42 to become disconnected (and therefore available for a new connection). A similar mechanism may be used for each link to allow links to be shared between a number of outputting threads.

Also, note that in embodiments the channels are bidirectional. As each channel end 42 has both input and output capabilities (status and data buffers), it can be used for both input and output at the same time. This means that any channel can be used to provide a pair of completely independent unidirectional channels, and in the case of channels between threads in different processors these will operate in opposite directions. Alternatively, a channel can be used to provide a bidirectional communication path to be used between two threads in which the direction of communication can change as the threads progress. Further, once established, a single identifier (the local channel end ID) may be used to identify a bidirectional channel, rather than having to use both the local and remote channel end ID.

In order to facilitate the detection of activity occurring over the channel, the input buffer 44 of each channel end 42 is associated with event registers 38. These may comprise a thread identifier (TID) register for storing an identification of a particular thread to be associated with an event that the thread is primed to act upon, and a continuation point vector (VECTOR) register for storing the position in the program where execution should resume upon occurrence of an event. These TID and VECTOR registers can then be used by the thread scheduler 18 and execution unit 16 to schedule threads in dependence on events. In order to set up a pending event, a thread identifier and continuation point vector are stored for the thread in the TID and VECTOR registers 38 of a particular channel end 42 by executing one or more instructions. The thread in question may then be suspended by executing a wait instruction. Once the event has occurred the thread (as identified by the TID register) will be triggered to return to a point in the code specified by the continuation point vector (as specified in the VECTOR register). The event may be the fact that data has been input to the input buffer 44 of the channel end 42, or alternatively, it would be possible to provide registers in the channel end 42 enabling a more specific event to be defined, such as that some particular data has been input to the input buffer 44. In embodiments, one or more of the ports 22 may equipped with a similar mechanism (not shown) for triggering suspended threads in response to activity at ports.

The channel end 42 also has a source enable flag 39 to selectively enable the channel end 42 to generate events, and disable it from generating events. The status register SR of each context 20 may comprise a thread event enable flag to selectively enable the respective thread to accept events, and disable it from accepting events. The source event enable flag may be turned on and off by executing one or more instructions, in embodiments a source event enable and disable instruction respectively; and the thread event enable flag may also be turned on and off by executing one or more instructions, in embodiments a thread event enable and disable instruction restively.

The flags allow the source and thread to be turned on and off independently of one another, and independently of an event which may be left set up in a channel end 42 or port 22 while one or both flags are tuned off. Thus an event can be set up at a port 22 or channel end 42, and then set to trigger the resumption of a suspended thread by asserting the flags. After the event triggers the thread, the event may be left set up at the port 22 or channel end 42 while one or both flags is de-asserted, so the port of channel will not generate an event when relevant activity occurs and/or the thread will not respond to it. Later, the event that has been set up can be re-used by re-asserting the flags.

As well as events, each of the channel terminals 42 may also be configured to receive and act upon interrupts which do involve loading of a program state from memory (e.g. memory 24) in order to handle the interrupt. In embodiments the channel terminals 42 may have flags allowing them to be enabled and disabled from accepting interrupts.

As mentioned, in embodiments the first processor 100 may be arranged as a general purpose processor and the second processor 200 may be arranged as an I/O processor for providing the functionality of one or more devices to the first processor 100, e.g. for driving one or more peripheral devices 8 and/or implementing one or more devices internally in software on the second processor 200. In embodiments the first processor 100 may be a single core, sequential execution processor while the second processor 200 is a multi-threaded processor comprising one or more cores 14. The first processor may comprise at least one ARM processor and the second processor 200 may comprise one or more xCOREs.

The present disclosure provides an interface for communicating across both the different communication media of a bus and an interconnect, e.g. a bus 80 and interconnect 40 as depicted in FIG. 1. This enables communication between a first processor configured to communicate using the bus protocol and a second, multi-threaded processor whose threads communicate over channels of the interconnect; e.g. to communicate between the first processor 100 and second processor 200 as depicted in FIG. 1.

For example in embodiments there is provided an xCORE to ARM interface "XAI", for on-chip or off-chip integration of one or more ARMs with one or more xCOREs. In embodiments the XAI is designed to decouple the real-time operations of the xCORE from the non-real-time world of the ARM, and may provide efficient use in that data can be transferred without busy waiting or bit-banging by the ARM.

Communication between the second processor 200 (e.g. one or more xCOREs) and the first processor 100 (e.g. ARM) is based on sending blocks of data between the two. In embodiments, the transfer is synchronised and only takes place when software on both the first and second processors 100, 200 have agreed that a transfer shall take place. The software on both sides may also be required to agree on the transfer size. There are different possible methods as to which side initiates the transaction (the master), and which sides responds and commits to completing the transaction (the slave).

There are various options for the low level communication mechanisms. One option is to use a memory bus as the bus 80 to transfer data, e.g. an AXI or EBI bus on the first processor 100. In this case the second processor 200 acts like a memory, and supplies a small number of registers enabling the first processor 100 to read or write data to those registers in a memory mapped fashion. In addition an interrupt mechanism such as an interrupt wire enables the second processor 200 to signal to the first processor for attention. This option may be preferable for bandwidth where such a bus is available (e.g. in the case of an SoC, or an external memory bus on a die). Another option is to use a peripheral bus for the bus 80, such as an SPI or I²C bus. Again, an interrupt mechanism such as an interrupt wire enables the second processor 200 to signal for attention. This option may offer lower bandwidth, but does not require access to a memory bus.

Figure 5A:
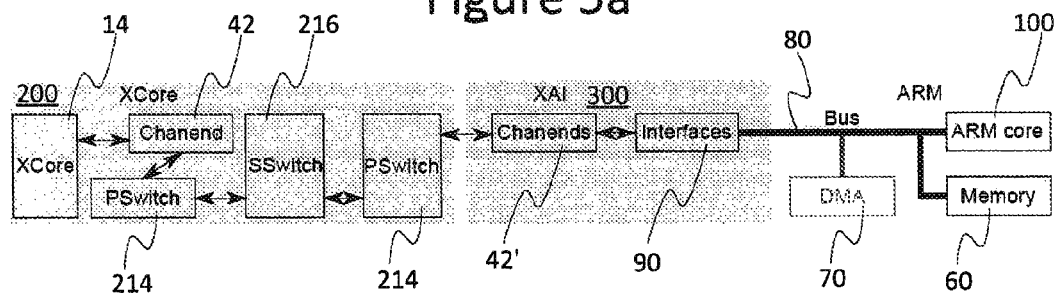
FIGS. 5a-5d schematically illustrate some options for interfacing between processors.

Regarding the interface itself, there are at least two possible implementations: a hard implementation and a soft implementation. A hard implementation is illustrated in FIGS. 1 and 5*a*. Here, an interface 300 in the form of a dedicated hardware block is connected between the bus 80 and the interconnect 40. On the bus side, the interface 300 comprises one or more sets of memory mapped interface registers 90 connected to the bus 80, each set 90 comprising one or more individual registers. The interface registers 90 of each set are associated with one or more memory addresses of the bus 80. Thus the first processor 100 is able to read from an interface register 90 by performing a read operation (READ) over the bus 80 addressed to an address of that register, and to write to an interface register 90 by performing a write operation (WRITE) over the bus 80 addressed to the relevant register 90.

On the interconnect side, the interface 300 comprises one or more instances 42' of a channel end. Each channel end 42' in the interface 300 is configured to mimic a channel end 42 of the inter-thread interconnect system 40, enabling a thread of the second processor 200 to use a channel end 42 of the interconnect 40 to establish a channel over the interconnect 40 with a channel end 42' of the interface 300, in an analogous fashion as it would to establish a channel with a channel end 42 used by another thread. In embodiments, each channel end 42' in the interface 300 may comprise any or all of the example features discussed above. In embodiments it may have the same architecture as illustrated in FIG. 4 (except it need not have a flag 43 for being claimed by a thread). Any of the teachings above regarding the way channel ends are connected and disconnected, the way they are used to pause and resume threads, and the way messages are routed between channel ends over the interconnect 40 (including the message and token formats) may apply equally in relation to the one or more channel ends 42' of the interface 300 as they do in relation to the channel ends 42 of the inter-tread interconnect 40 itself, except that the channel ends 42, 42' are communicating between a thread and the interface 300 instead of between two threads.

The interface 300 comprises a respective instance 42' of a channel end connected to each of set of interface registers 90. As the registers are memory mapped, the interface 300 provides an association between each channel end 42' of the interface 300 and a respective one or more bus addresses of the bus 80. The interface 300 also provides a mechanism for performing synchronized data transfer between an addressed register 90 on the bus side and the corresponding channel end 42' on the interface side. Thus the interface 300 is able to take one or more READ operations performed over the bus 80 addressed to a given interface register 90, and map these to one or more IN operations performed on the input buffer of the channel end 42' in the interface 300, thereby accepting data over the interconnect 40 from the thread to which that channel end 42' has been connected to form a channel (via the channel end 42 of that thread). Similarly, the interface 300 is able to take one or more WRITE operations performed over the bus 80 addressed to a given interface register 90, and map these to an OUT operation performed on the output buffer of the channel end 42' in the interface 300, thereby sending data over the interconnect 40 to the thread to which that channel end 42' has been connected to form a channel (again via the channel end 42 of that thread).

In embodiments the interface 300 comprises a mechanism which maps between sequence of READs and a sequence of INs, and which maps between a sequence of WRITEs and a sequence of OUTs; where the READs of each READ sequence may be interleaved with the INs of the corresponding sequence according to a handshake protocol, and also the WRITEs of each WRITE sequence may be interleaved with the corresponding OUTs according to a handshake protocol. However in alternative embodiments it is not excluded that there could be a one-to-one mapping between READs and INs, and between WRITEs and OUTs.

In embodiments, a respective channel end 42' in the interface 300 may be used for each device to be driven by the second processor 200, e.g. each peripheral device 8 and/or each device implemented internally on the second processor 200 for the benefit of the first processor 100. The number of channel-ends on the second processor 200 can be increased to enable a multitude of devices to be supported.

In embodiments, on the interconnect side the interface 300 may in fact comprise two channel-ends 42' open to communication for each device: a master channel end for use when a thread on the second processor 100 is acting a master to the first processor 100, and a slave channel end for use when the thread is acting as slave to the first processor 100. Each of the master and slave channel ends 42' in the interface 300 has its own respective set of registers 90 on the bus side. The interface channel ends 42' are ready to accept messages that indicate (master) a request to read or write data and (slave) willingness to accept reads or writes. The channel-ends 42' may be connected to an instance of a PSWITCH 214 that arbitrates access to the main switch 216 (through a PLINK 220) or access to an XLINK 218. Both master and slave channel ends 42' have a destination register 41 that records the channel end 42 of the interconnect 42 that they are connected to. There also may be implementations where only the slave or master channel end 42' are required (in which case the extra PSWITCH 214 may not be required either).

The following gives an example layout of the register map on the bus side for each set of interface registers 90 (there being one set 90 per interface channel end 42').

Register 0 of each set 90 is a status register. It indicates whether a transfer is requested, the direction of transfer, and whether a token request was successful. It may be read-only when slave, and read-write when master.

Register 1 of each set 90 is a size register. It indicates the size of the data transaction. It may be read-only when slave, and read-write when master.

Register 2 of each set 90 is the actual data transfer register, for transferring data.

These registers may be given the natural width of the bus 80: e.g. a word in the case of a memory mapped bus, or a byte in the case of a peripheral bus.

In embodiments there is allocated one set of registers 90 per device that is to be driven or implemented by the second processor 200, or one master set and one slave set per device, with one channel end 42' per set 90 or per pair of master and slave sets 90. Alternatively it is not excluded that such registers could be shared between devices. For example the set 90 associated with a given channel end 42' may comprise multiple sets of bits, i.e. bits for each of the devices.

The interface 300 could be implemented in a separate die or chip package, or could be integrated into the same die or chip package as one or both of the first and second processors 100. FIG. 5c shows a system-on-chip (SoC) implementation in which the interface 300 is integrated onto the same die or chip package as one or more cores 14 of the second processor 200, e.g. integrated into an xCORE tile. FIG. 5d shows an implementation in which the interface is integrated onto the same die or chip package as the first processor 100, e.g. in a bespoke ARM incorporating an instance of a PSWITCH 214 and XLINK 218.

Figure 5B:
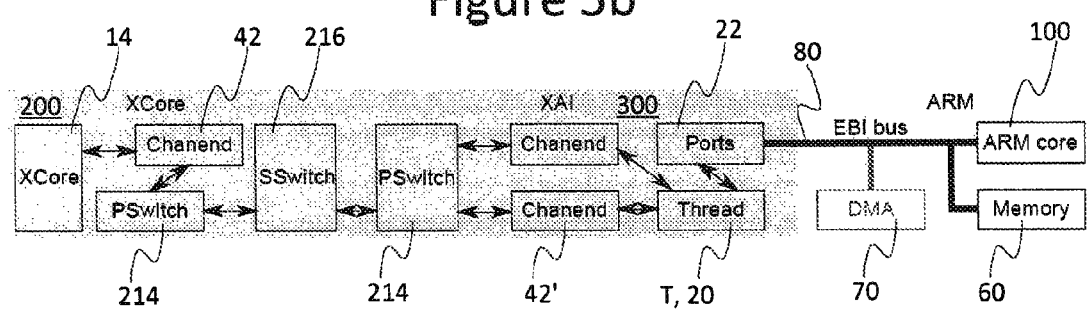
Figure 5C:
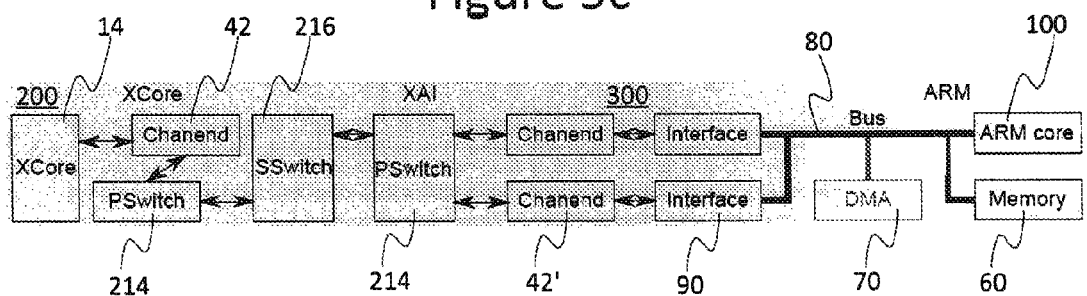
Figure 5D:
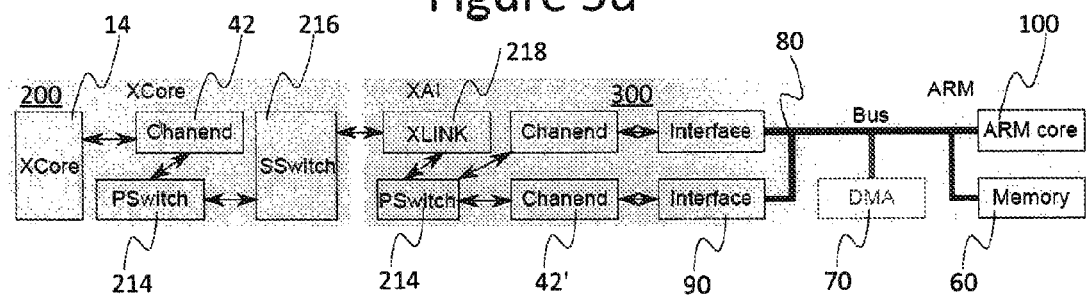

A soft implementation is illustrated in FIG. 5b. Here, the second processor 200 is in fact connected to the bus 80 by a port of the second processor 200, e.g. an existing port of an xCORE, and not by a dedicated hardware interface block 300. However, the bus protocol is not implemented (or at least not completely so) in hardware on the bus side of the port 22. Rather, the bus protocol is implemented in software on one of the threads running on the second processor 200.

In this case, the first thread implementing the bus and interface protocol is arranged to establish a channel over the interconnect 40 with a second thread, e.g. a device driver thread providing the desired functionality for the benefit of the first processor 100. The port 22 receives raw data and addresses from the bus 80, and first the thread interprets the address to determine when it is being addressed and processes the incoming data to convert to a form suitable for communicating over the interconnect 40 to the second thread, e.g. the device driver thread. Similarly in the other direction, the first thread processes data from the second thread to convert to a form suitable for transmission over the bus, and outputs the data from the port 22 and over the bus 80 addressed to the first processor 100. In such embodiments, functionality of what are seen as memory mapped registers by the bus 80, may in fact be implemented in software of the interface thread for the purpose of implementing a protocol corresponding to that discussed in relation to the hardware version of the interface 300.

Thus the interfacing thread coverts between a sequence of READS or WRITEs over the bus and a sequence of INs or OUTs over the interconnect 40 N.B. as in the hardware implementation, there is not necessarily a one-to-one mapping between READs and INs or between WRITEs and OUTs, but in this implementation the it is the thread that handle the protocol for converting between the sequences.

In either a soft or hard implementation, the first processor 100 may communicate with the interface 300 either via a DMA controller 70, or by performing the reading and writing of data to the specified memory locations directly itself.

The following now describes an example of a communication protocol that may be used to communicate across the bus-interconnect interface 300 in accordance with embodiments disclosed herein. The protocol is discussed in relation to just one pair of channel-ends 42, 42', but it will be appreciated that the same protocol may be applied for other pairings.

Communications across the interface are preferably synchronised in that one of the processors 100, 200 acts as master (i.e. it initiates a transaction) and the other slave (in ints slave role it only response to transactions initiated by the master), and/or in that the communication only goes ahead once both processors 100,200 have committed to the transaction.

In embodiments there are up to three communication methods: (a) the second processor 200 is the master and initiates communication; (b) the first processor 100 is the master and initiates communication; and/or (c) the master and slave roles can be switched dynamically, e.g. with a role-token governing which side is the master and can initiate communication (N.B. this is a different kind of token than the communication tokens discussed above—it is a claimable item that can be claimed by only one of the first and second processors 100, 200 at any one time, not a unit of communication 900 for building messages 101).

When the second processor 200 is master, communication is initiated by the second processor 200 signalling its willingness to transfer data. The application on the second processor 200 starts by sending a short message to the interface 300. For example in embodiments this message may comprise five tokens 900: three data tokens specifying the channel end 42 on the second processor 200 that is the communication endpoint for this data transfer, and one data token specifying the size and direction of the data transfer (e.g. 1 bit for the direction and 7 bits to specify the number of words), followed by an END token.

Once the application on the second processor 200 has output this initial message, it waits for a confirmation that the slave (first processor 100) is ready. The initial message will be delivered to the interface 300 where it will be used to populate the destination register 41 of the master channel end 42' in the interface 300, and the size register and direction bit in the respective set of interface registers 90 of that channel end. An interrupt is then raised to the first processor 100. The first processor 100 will enter its interrupt handler, inspect the request (by reading the status and size registers via a READ operation over the bus 80), and when it is capable to deal with the request, it will perform the data transfer by performing a sequence of READ and WRITE transactions over the bus 80, for example by executing repeated LOAD and STORE instructions, or by programming a DMA unit 70 to perform these operations.

To transfer data from the first processor 100 to the second processor 200 when the second is master, any data written to the bus 80 is transmitted as a sequence of data tokens to the destination channel end 42 in the interconnect 40 (as indicated by the slave destination register 41 of the master channel end 42'), where the second processor 200 is ready to accept the data transfer. In embodiments words of data are sent most significant byte first. An END token is transmitted after the last data. Note that in embodiments, the application on the first processor 100 doesn't have to know about the token protocol 101, 900 of the interconnect 40, as the interface 300 is configured to automatically reformat a sequence of bus transaction received over the bus 80 into a sequence of tokens 900 sent over the interconnect 40.

To transfer from the second processor 200 to the first processor 100 when the second is master, the first READ operation from the first processor 100 triggers an empty message requesting data from the application on the second processor 200. The application will respond by sending the data. In embodiments words of data are sent most significant byte first. When the last word is transmitted the second processor 200 sends an END token. Note that in embodiments, the application on the second processor 200 doesn't have to know about the bus protocol, as the interface 300 is configured to automatically reformat a sequence of tokens 900 received over the interconnect 40 into a sequence of bus transactions sent over the bus 80.

At the end of the transaction in either direction when the second processor 200 is master, the master channel end 42' in the interface 300 is disconnected by the END token, and the status register (in the respective interface set of interface registers 90) is cleared indicating that the interface 300 is ready for the next transfer when both first and second processors 100, 200 are ready to do so.

When the first processor 100 is the master, the interface 300 is initialised by the application on the first processor 100 by setting the destination register 41 of the slave channel end 42', by transmitting a message to that channel end 42' over the bus 80. In embodiments this message may comprise five tokens: three data tokens specifying the destination channel end and a data token carrying some constant or arbitrary dummy value (e.g. a value of 2), followed by an END token (the dummy token takes the place of the token that would have specified the size and direction when the second processor is master 200, just to maintain the same message format, though it is not essential to do so in all possible embodiments). When the first processor 100 wishes to initiate a request, it does so by setting the size register and by writing the direction to the status register (in the respective interface register set 90). The second processor 200 observes this, and sends a small (e.g. one word) message to the application on the second processor 200 containing the size and direction information. It uses the destination register 41 of the slave channel end 42' to determine where to send the message to. When the application on the second processor is ready to honour the request, it sends an empty message to the interface 300 signalling that the data transfer can start, causing the interface 300 to send an interrupt to the first processor 100.

To transfer from the first processor 100 to the second processor 200 when the first is master, any data written to the bus 80 is transmitted as a sequence of data tokens to the destination channel end 42 in the interconnect 40 (as indicated by the slave destination register 41 of the slave channel end 42'), where the second processor 200 is ready to accept the data transfer. In embodiments words of data are sent most significant byte first. When the data size is reached, an END token is transmitted.

To transfer data from the second processor 200 to the first processor when the first is master, the application on the processor 200 sends data to the slave channel end 42'. The first processor 100 will be issuing READ requests and the interface 300 supplies data. After the final word, the application on the second processor 200 transmits an END token, closing down the communication.

At the end of the transaction in either direction when the first processor 100 is master, the slave channel end 42' is disconnected by the END token, and the status register (in the interface register set 90) is cleared indicating that the interface 300 is ready for the next transfer when both the first and second processors 100, 200 are ready to do so. The destination register 41 of the slave channel end 42' still contains a valid channel end ID, enabling the a next slave communication to start if required.

In the dynamic master mode, either side can act as a master as required. This may be useful, for example, for situations where traffic may originate on either side, such as with an Ethernet IP stack.

A claimable token indicates which side is the master. In embodiments the token is initially owned by the second processor 200, and the system is idle. The system can be taken out of its idle mode by either (a) the second processor 200 initiating a request by asserting an interrupt or (b) the first processor 100 claiming the token by reading from a control register. This unsolicited read operation claims the token. There may be a race-condition where either side wants to start. In embodiments the second processor 200 arbitrates this by either allowing the read to succeed (by setting the token bit in the status register) or by causing an interrupt to the first processor. In embodiments if the token has been claimed successfully by the first processor 100, it is returned at the end of the transaction, either implicitly or explicitly.

At application level, there are two tasks on the second processor 200: one that may perform master requests, and one that can deal with slave requests. The slave task side initiates the slave destination register.

There may be four possible scenarios. In a first scenario, the first processor 100 wants to perform a master transaction: it reads the status register, succeeds, and performs a master request as normal.

In a second scenario, the second processor 200 wants to perform a master transaction: it interrupts the first processor 100, and performs a master request as normal.

In a third scenario, the first processor 100 wants to perform a master transaction, but just prior to it reading the status register in order to do so, the application on the second processor 200 has issued a conflicting master request. The second processor 200 interrupts the first processor 100, and performs a master request as it would otherwise. The first processor 100 has some buffer space to store this master request. After this, the first processor 100 retries its master transaction.

In a fourth scenario, the second processor 200 wants to perform a master transaction, but just prior to it performing the interrupt to do so, the first processor 100 has issued a load on the status register that succeeds in initiating a conflicting master transaction. The interface 300 stores the master channel end's destination, and completes the master transaction on behalf of the first processor 100. It can do this as the link into the switch is available. At the end of this transaction, the interface 300 retries the master transaction on behalf of the second processor 200 by asserting an interrupt to the first processor 100.

It will be appreciated that the above embodiments have been described only by way of example. For example, the teachings herein are not limited in application to the particular first and second processors exemplified above, nor to any particular topology of multi-thread or multi-core processor, nor any particular number of cores. Further, other interconnects or protocols may be used, and/or other mechanisms for associating bus addresses with thread channels or channel terminals. Other variants may become apparent to a person skilled in the art given the disclosure herein. The scope of the disclosure is not limited by the described embodiments but only by the accompanying claims.

The invention claimed is:

1. A processing apparatus comprising:
   a bus;
   a first processor connected to the bus and configured to perform read and write operations over the bus according to a bus protocol;
   a second processor arranged to execute multiple threads;
   an inter-thread interconnect comprising a system of channel terminals, each operable to be used by one of the threads to perform input and output operations over a channel comprising a logical connection with another channel terminal, including being operable to perform input and output operations over a channel with another of said channel terminals used by another of said threads; and
   an interface between the bus and the inter-thread interconnect, comprising a bus side implementing the bus protocol and an interconnect side having an instance of at least one channel terminal, wherein the first processor is thereby operable to communicate with a designated one of said threads via: (i) the bus and (ii) a respective one of said channels between the channel terminal of the interface and a respective one of the channel terminals of the inter-thread interconnect used by the designated thread, the interface providing an association between read and write operations over the bus and input and output operations performed by the channel terminal of the interface:

wherein either:
   (a) the bus side implements the bus protocol in dedicated hardware circuitry, and the channel terminal of the interface comprises a block in the interface imitating one of the channel terminals of the interconnect; or
   (b) the bus side implements the bus protocol in software of a first of said threads, the channel terminal of said interface being one of the channel terminals of said interconnect used by the first thread to communicate with the designated thread via the channel with the channel terminal of the designated thread.

2. The processing apparatus of any preceding claim, wherein the first processor is arranged to run at least part of a device driver for a device, and the designated thread is programmed to provide functionality of the device to the first processor.

3. The processing apparatus of claim 2, wherein the second processor comprises a port for connecting to a peripheral device, said device comprising the peripheral device and said functionality comprising providing a front-end part of the device driver for driving the peripheral device via the port.

4. The processing apparatus of claim 1, wherein the bus side comprises a set of one or more registers being addressable via said bus according to said bus protocol, comprising at least a data register configured to transfer data between the data register and the channel terminal of the interface in order to perform said communication between the first processor and the designated thread via the bus and respective channel.

5. The processing apparatus of claim 4, wherein the set of registers comprises one or more further registers for storing information relating to said transfer, for signalling the information to and/or from the first processor to facilitate the communication with the designated thread on the second processor.

6. The processing apparatus of claim 5, wherein the one or more further registers comprising one or both of: a size register for signalling a size of the data, and/or a status register for signalling a status of the transfer.

7. The processing apparatus of claim 1, wherein the first processor acts as master to initiate the communication with the designated thread on the second processor, the second processor acting as slave to the first processor.

8. The processing apparatus of claim 1, wherein the second processor acts as master to initiate the communication with the first processor, the first processor acting as slave to the second processor.

9. The processing apparatus of claim 1, operable to dynamically switch between the first and second processor acting as master to initiate the communication between the first processor and the designated thread of the second processor, the other acting as slave to the master.

10. The processing apparatus of claim 9, wherein the interface comprises a master channel end used to perform the communication when the second processor is master, and a slave channel end used to perform the communication when the second processor is slave to the first processor.

11. The processing apparatus of claim 9, configured to provide a master token which can be claimed by only one of the first and second processors at any one time, the processor claiming the token being allowed to act as the master and the other acting as the slave.

12. The processing apparatus of claim 9, wherein to handle a scenario where both the first and second processors attempt conflicting claims to act as the master, the second processor is arranged to be responsible for arbitrating the conflicting claims.

13. The processing apparatus of claim 9, wherein to handle a scenario where both the first and second processors attempt conflicting claims to act as the master, the processing apparatus is configured to store the claim of one of the processors while completing the communication initiated by the other of the processors, and to then retrieve the stored claim and complete the communication initiated by said one of the processors.

14. The processing apparatus of claim 1, wherein each of the channel terminals of the interconnect and interface is operable to be dynamically connected to another of the channel terminals to create a channel between them, and to be subsequently disconnected for use to create a different channel by connecting to a further one of the channel terminals.

15. The processing apparatus of claim 14, wherein each channel terminal of the interconnect and interface comprises a register arranged to record which other channel terminal it is currently connected to.

16. The processing apparatus of claim 1, wherein each of the channel terminals of the interconnect is operable to be dynamically claimed for use by one of the threads, and to be subsequently released for use by a further one of the threads.

17. The processing apparatus of claim 1, wherein:
each of the channel terminals comprises an input buffer and an output buffer;
the second processor comprises at least one thread scheduler operable to schedule the threads;
when an inputting one of said threads performs one of said input operations attempting input data from any of the channel terminals of the interface or interconnect that does not currently have data available in its input buffer, the thread scheduler pauses the inputting thread until the data is available; and
when an outputting one of said threads performs one of said output operations attempting to output data to any of the channel terminals of the interface or interconnect whose output buffer is not currently available for output, the thread scheduler pauses the outputting thread until the output buffer becomes available.

18. The processing apparatus of claim 1, wherein:
the second processor comprises at least one thread scheduler operable to schedule the threads, including to suspend said designated thread pending an event; and
at least one of the channel terminal of the interface or the channel terminal used by the designated thread comprises event logic configured to generate said event in dependence on activity occurring over the respective channel, the event causing the designated thread to be resumed from said suspension.

19. The processor of claim 1, comprising an interrupt mechanism whereby the channel terminal of the interface is operable to receive an interrupt from the first processor, and/or the first processor is operable to receive an interrupt from the interface, the communication between the first processor and the designated thread on the second processor being instigated based on one of said interrupts.

20. The processing apparatus of claim 1, wherein the interconnect is a switch-based interconnect comprising one or more switches configured to work by routing messages selectively to specific destinations.

21. The processing apparatus of claim 1, wherein interface and bus comprise and interrupt mechanism allowing second processor to raise an interrupt to the first processor, in order to facilitate said communication with the first processor.

22. The processing apparatus of claim 21, wherein the second processor comprises multiple cores, some of said threads being implemented on different ones of said cores and the channel terminals of said interconnect being operable to establish channels between the threads on the different cores.

23. The processing apparatus of claim 1, wherein the second processor comprises one or more cores, at least some of said threads being implemented on a same one of said cores and the channel terminals of said interconnect being operable to establish channels between the threads on the same core.

24. A computer program product comprising code embodied on a non-transitory computer-readable storage medium, the code comprising at least a first thread to be executed on a multi-thread processor, wherein the first thread is configured so as when executed on the multi-thread processor to provide an interface between a bus and an inter-thread interconnect of the multi-thread processor, by:
implementing a bus protocol of the bus in the code of the first thread, and performing one or more bus transactions to communicate with a first processor over said bus using the bus protocol; and
communicating with a second thread of the multi-thread processor over a channel of said inter-thread interconnect;
wherein the communication with the second thread over said channel is based on the one or more transactions performed to communicate with the first processor using said bus protocol, or vice versa.

25. A method comprising:
using a first processor to run at least part of a respective device driver for each of one or more devices, the first processor being arranged to communicate with each device over a bus according to a bus protocol based on memory mapped addresses;
using at least one respective thread of a second, multi-thread processor to provide functionality of each device to the part of the respective device driver on the first processor; and
providing an interface between the bus and an interconnect of the second processor, the interconnect being operable to communicate between the threads using a system of channels;
wherein the interface is provided by associating one or more memory mapped addresses of the bus with a channel of the interconnect, thus presenting the functionality of the device to the first processor as being accessible via one or more addresses on said bus, and presenting the first processor to the respective thread as being accessible over a channel of said interconnect.

26. The method of claim 25, wherein the second processor comprises one or more ports for connecting to peripheral devices, at least one of said one or more devices comprising a peripheral device and said functionality comprising driving the peripheral device via one of the ports.

* * * * *